No. 638,801. Patented Dec. 12, 1899.
R. M. DIXON.
SYSTEM FOR PROPELLING RAILWAY CARS.
(Application filed Dec. 15, 1898.)
(No Model.)
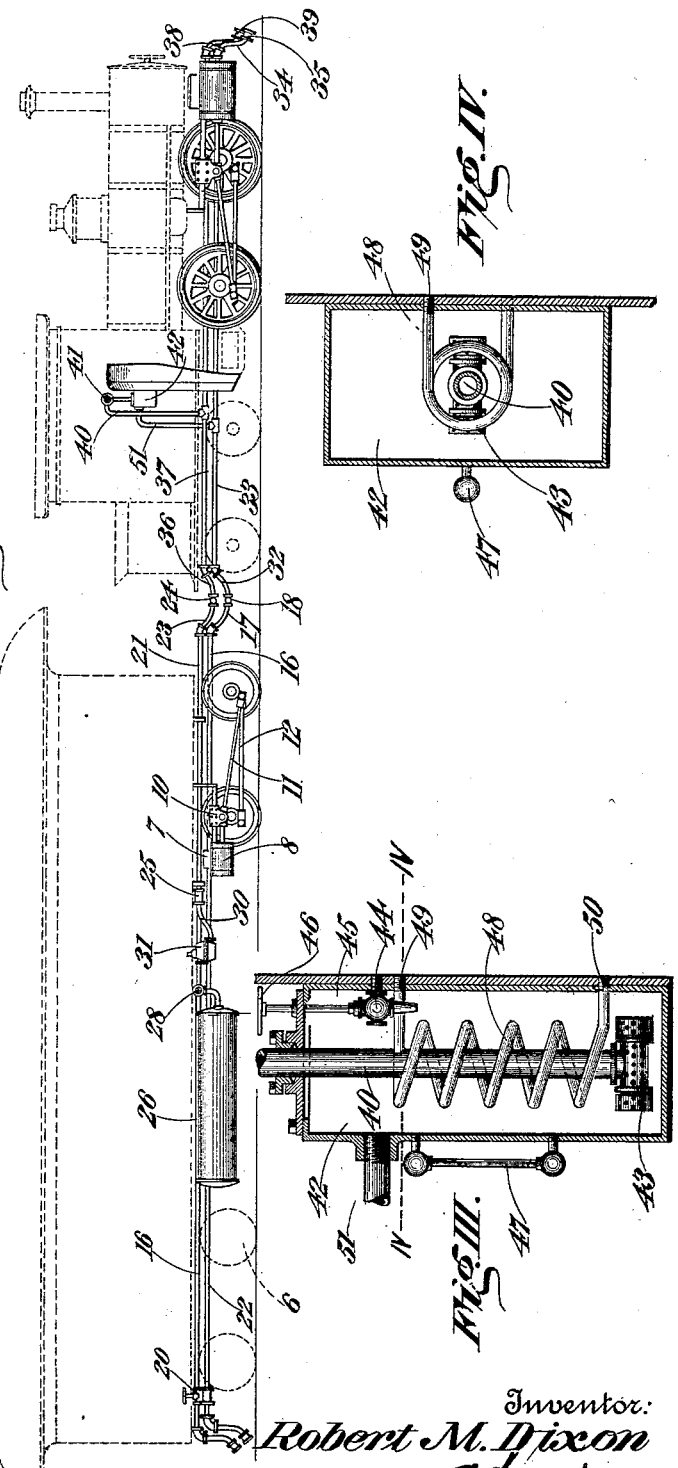
Witnesses:
M. E. Fowler
Stephen A. Brooks
Inventor:
Robert M. Dixon
By Joseph T. Atkins,
Attorney.
THE NORRIS PETERS CO., PHOTO-LITHO., WASHINGTON, D. C.

UNITED STATES PATENT OFFICE.

ROBERT MUNN DIXON, OF EAST ORANGE, NEW JERSEY.

SYSTEM FOR PROPELLING RAILWAY-CARS.

SPECIFICATION forming part of Letters Patent No. 638,801, dated December 12, 1899.

Application filed December 15, 1898. Serial No. 699,375. (No model.)

*To all whom it may concern:*

Be it known that I, ROBERT MUNN DIXON, of East Orange, in the county of Essex, State of New Jersey, have invented certain new and useful Improvements in Systems for Propelling Railway-Cars or the Like, of which the following is a complete specification, reference being had to the accompanying drawings.

The object of my invention is to provide a car or the cars of a train with an auxiliary motor or motors adapted to assist the locomotive or main propulsive member of the train in quickly starting and hauling heavy trains, as well as for imparting motion, as in switching, to a car or cars disconnected from and independent of the locomotive.

In the accompanying drawings, Figure I is a diagrammatical plan view of a locomotive and the first car of a train equipped with my apparatus, the outlines of the locomotive and car being shown in dotted lines. Fig. II is a similar view illustrating the apparatus in side elevation. Fig. III is a central vertical section, partially in elevation, of the reheater detached. Fig. IV is a section on the line IV IV of Fig. III.

Referring to the figures on the drawings, 1 indicates the cab of a locomotive, 2 the boiler, and 3 the wheels thereof.

4 indicates a car-body, 5 the wheels of one truck thereof, and 6 the wheels of the other truck. One truck—for example, that one having wheels 5—is equipped with a motor that is adapted to be operated by compressed air or other suitable source of energy. For the purposes of this description the motor is assumed to be a compressed-air motor. It consists, for example, of a pair of steam-chests 7, carried, respectively, upon opposite sides of the truck, and cylinders 8. The cylinders are provided, respectively, with pistons, (not illustrated,) piston-rods 9, cross-heads 10, connecting-rods 11, and parallel rods 12, adapted to communicate motion from the pistons to the wheels 5. The particular type of motor and mechanism connecting it to the wheels is shown only by way of example and in illustration of the principle of my invention. A different motor and different means of connecting it with the wheels are of course contemplated within the scope of said principle.

The steam-chests 7 communicate, respectively, through pipes 13 and 14 and a four-way fitting 15 with a train-pipe 16. The "train-pipe" is so called because, extending the entire length of one car, it is provided at opposite ends with flexible connections 17 and self-closing couplers 18, whereby the pipes or contiguous cars may be joined throughout the length of a train.

Near the opposite ends of each car, respectively, I provide crossovers 19, provided, respectively, with valves 20, which serve to connect the pipe 16 of each car with pipes 21 and 22, also running collectively the full length of the car and terminating in flexible connections 23 and self-closing couplers 24. The pipes 21 and 22 are, in effect, a continuous pipe, being united by a T-fitting 25, through which by way of a suitable pipe connection communication is made with a source of power-supply, in this case assumed to be compressed air. The source of power-supply is represented by a cylinder or reservoir 26, that is carried underneath the car and adapted to hold a charge of air under very high pressure, say one thousand pounds or over. Obviously more than one cylinder may be employed, if required; but one is sufficient for the purpose of this description.

The reservoir 26 is adapted, for the sake of convenience, to be charged from either side of the car through a pipe connection 27, provided at its opposite ends with valves 28. The pipe 27 also affords the means of communication through pipes 29 and 30 and an intermediate reducing-valve 31 with the T-fitting 25, previously referred to.

Although the reservoir 26 is charged to a very high pressure, the air is supplied to the cylinders 8 at a low pressure, for which reason the pressure-reducing valve 31 is employed. This valve may be of any suitable and preferred type, such as is well known in the art, and does not, therefore, require detail illustration and description.

The pipe 16 communicates through the coupler 18 and flexible connection 32 with a pipe 33, extending underneath the entire length of the locomotive and terminating at its forward end in a flexible connection 34 and coupler 35. Similarly, as through a flexible connection 36, the pipe 21 communicates with a pipe 37, extending underneath the entire length of the locomotive and terminating at its forward end in a flexible connection 38 and coupler 39. The pipe 37 communicates, as through a branch pipe 40, provided with a controlling-valve 41, with the interior of a reheater 42, located at a convenient point within the cab of a locomotive. The pipe 40 descends within the reheater from the top almost to the bottom and terminates, preferably, in a branched foraminous terminal 43.

The reheater 42 is designed to be partially filled with hot water, which may be replenished from time to time, as required, through a cock 44, communicating with the interior of the locomotive-boiler 2. The stem 45 of the cock 44 extends through the case of the reheater and terminates in a hand-wheel 46 on the outside of the case.

47 indicates an ordinary gage for indicating the height of the water-level in the reheater.

48 indicates a closed circulating-coil communicating at its opposite ends, as indicated at 49 and 50, with the interior of the boiler 2. It is designed to maintain the temperature of the water in the reheater by gravity circulation. The pipe 16 communicates with the reheater above its water-level through a branch pipe 51.

The operation of my apparatus is as follows: Assume the reservoir 26 of the car 4 to be charged, the rear couplers 24 and 18 to be closed, and the pipes 16 and 21 to be coupled, respectively, with the pipes 33 and 37, whose forward ends are closed by the couplers 35 and 39, the valves 20 being closed. Suppose that the engineer wishes to utilize the apparatus for assisting in starting the train. He opens the valve 41, and thereby admits air, whose pressure is regulated in passing from the reservoir 26 through the reducing-valve 31 from the pipe 40 into the body of heated water within the reheater 42. It has been found by experiment that in about every fifty cubic feet of air passing through water at a temperature of between 200° and 275° Fahrenheit there will be carried with the air as a vapor about one pound of water. The presence of this water-vapor about doubles the efficiency of the air for motive-power purposes. Consequently the air, with its added efficiency through reheating, passes from the reheater 42 through the pipes 51 33 16 and the pipes 13 and 14, respectively, that are in operative communication with the motors on the car 4. If there be more than one car in the train, the air will pass successively from each of the cars through the reheater and through the connected pipes 16 of the several cars to the respective motors of each car. The effective assistance, therefore, of each auxiliary motor is placed within control of the engineer for starting the train.

It may be noted in this connection that the engine is designed to be operatively coupled at either end to a car or the cars of a train.

As before specified, my apparatus may be employed in switching a car or the cars of a train when disconnected from the locomotive. For example, let it be assumed that the car 4 is separated from the locomotive. The couplers 18 and 24 automatically operate to prevent through them the escape from the reservoir 26 of the air which remains confined within the pipes 21 and 22. Under such condition by opening either of the valves 20 compressed air will be delivered through the pipe 16 to the motors, which thereupon afford independent means of propulsion for the car.

What I claim is—

1. The combination with a locomotive or main propulsive member of a train, and a plurality of cars completing the train, of a pair of train-pipes extending from the locomotive through suitable intermediate connections between the same and the cars, respectively, and means for closing them at their opposite extremities, an auxiliary fluid-pressure motor upon each car in operative communication with one of the train-pipes, a source of fluid-pressure supply upon each car in operative communication with the other train-pipe, means of communication upon the locomotive between the train-pipes, and a valve controlling said means of communication.

2. The combination with a car, fluid-pressure motor, and source of fluid-pressure supply thereon, of a pair of train-pipes extending lengthwise of the car from end to end, means for closing the opposite extremities of said pipes, one of the pipes being in operative communication with the motor, and the other in like communication with the source of fluid-pressure supply, and valve-controlled means of communication between the pipes.

3. The combination with a car, fluid-pressure motor, and source of fluid-pressure supply thereon, of a pair of train-pipes extending lengthwise of the car from end to end, means for closing the opposite extremities of said pipes, one of the pipes being in operative communication with the motor, and the other in like communication with the source of fluid-pressure supply, and independent valve-controlled means of communication between the pipes near their opposite extremities, respectively.

4. The combination with a locomotive, its boiler and a pair of pipes adapting it to be coupled to a car of the kind specified, of a reheater, a closed coil extending from the boiler through the reheater, a valve-controlled branch extending from one pipe into the reheater, below its water-level, and another branch connecting the other pipe with the interior of the reheater above its water-level.

5. The combination with a locomotive, its boiler and a pair of pipes adapting it to be coupled to a car of the kind specified, of a reheater, a closed coil extending from the boiler through the reheater, and valve-controlled means of supplying water to the interior of the reheater from the boiler.

In testimony of all which I have hereunto subscribed my name.

ROBERT MUNN DIXON.

Witnesses:
ERNEST F. SLOCUM,
RANDOLPH PARMLY.